United States Patent [19]

Kistenmacher et al.

[11] Patent Number: 5,863,956
[45] Date of Patent: Jan. 26, 1999

[54] MESOMORPHIC COMPLEXES OF POLYELECTROLYTES AND SURFACTANTS, PROCESS FOR PRODUCING THE SAME AND FILMS, FOILS, FIBERS, MOLDED BODIES AND COATINGS MADE THEREOF

[75] Inventors: Axel Kistenmacher, Ludwigshafen; Markus Antonietti, Marburg-Schroeck; Juergen Conrad, Marburg, all of Germany

[73] Assignee: BASF Aktiengesellschaft, Ludwigshafen, Germany

[21] Appl. No.: 776,710

[22] PCT Filed: Aug. 2, 1995

[86] PCT No.: PCT/EP95/03073

§ 371 Date: Feb. 12, 1997

§ 102(e) Date: Feb. 12, 1997

[87] PCT Pub. No.: WO96/05235

PCT Pub. Date: Feb. 22, 1996

[30] Foreign Application Priority Data

Aug. 12, 1994 [DE] Germany ............ 44 28 641.4

[51] Int. Cl.$^6$ .................................................. C08F 20/02
[52] U.S. Cl. .......................................... 521/31; 521/32
[58] Field of Search .............................. 521/30, 31, 32

[56] References Cited

U.S. PATENT DOCUMENTS 4,501,835  2/1985  Berke ........................................ 524/32

*Primary Examiner*—Edward J. Cain
*Attorney, Agent, or Firm*—Oblon, Spivak, McClelland, Maier & Neustadt, P.C.

[57] ABSTRACT

Mesomorphic complexes which comprise anionic polyelectrolytes, cationic polyelectrolytes and/or polyampholytes and cationic, anionic, nonionic and/or amphoteric surfactants.

19 Claims, No Drawings

MESOMORPHIC COMPLEXES OF POLYELECTROLYTES AND SURFACTANTS, PROCESS FOR PRODUCING THE SAME AND FILMS, FOILS, FIBERS, MOLDED BODIES AND COATINGS MADE THEREOF

BACKGROUND OF THE INVENTION

1. Field of the Invention

The present invention relates to novel mesomorphic complexes of anionic polyelectrolytes, cationic polyelectrolytes and/or polyampholytes and cationic, anionic, nonionic and/or amphoteric surfactants. The invention further relates to methods for preparing them and to films, sheets, fibers, moldings and coatings therefrom.

2. Discussion of the Background

It is known that polyelectrolyte complexes form spontaneously between polyelectrolytes and oppositely charged surfactants. The formation of complexes between polyelectrolytes and nonionic surfactants has likewise been described. Most of the relevant publications deal with aqueous solutions of these complexes, whereas but little is known about the properties and the structure of such polyelectrolyte-surfactant complexes as solids.

EP-A 492 188 (1) describes solid, amorphous complexes of polyelectrolytes and oppositely charged surface-active agents which can be used as sorbents for treating water contaminated with organic compounds. Herein the complexes are obtained as precipitates by means of the polyelectrolyte and the surfactant being mixed in a solvent or by the polyelectrolyte being prepared in a solution of the surfactant via polymerization.

DD-A 270 012 (2) describes the preparation of membranes composed of a polyelectrolyte complex comprising cellulose sulfate and a cationic surfactant The membranes are prepared by a film of cellulose sulfate being precipitated with an aqueous solution of the cationic surfactant to produce an amorphous polyelectrolyte complex.

SUMMARY OF THE INVENTION

The materials, such as films or membranes, composed of these amorphous polyelectrolyte complexes are often still in need of improvement with respect to their mechanical, thermal or application characteristics. It is therefore an object of the present invention to provide such materials having improved characteristics.

We have found that this object is achieved by means of the mesomorphic complexes of polyelectrolytes and surfactants as defined at the outset.

DETAILED DESCRIPTION OF THE PREFERRED EMBODIMENTS

The term "mesomorphic" in this context refers to substances or materials which have a mesomorphic phase, ie. a liquid-crystalline structure, and in which—at least in certain domains—an ordered arrangement of the molecular building blocks or an ordered arrangement of the supramolecular aggregates is present. They differ from amorphous substances or materials, for example, in that, owing to their anisotropy, they have special optical properties.

Clearly, in this case, for a number of applications the orientation or ordered arrangement of the molecular building blocks and supramolecular aggregates in a mesoscopic or larger dimension is most advantageous. The order parameter of the material affects, inter alia, the mechanical, thermal and also the optical properties of the material in question.

The orientation of the molecular building blocks and of the supramolecular aggregates compared with the corresponding amorphous material, therefore in this case results in an improvement in the application properties being achieved or even in the emergence of novel, desirable characteristics.

The mesomorphic structure of the novel polyelectrolyte-surfactant complexes can be detected unambiguously by means of small-angle X-ray diffractometry. This shows one or more narrow scattering peaks which characterize a liquid-crystalline morphology. Furthermore, photographs obtained by polarizing microscope under crossed polarizers for the majority of mesomorphic structures indicates typical textures of birefringent domain structures.

The novel mesomorphic complexes of polyelectrolytes and surfactants comprise one polyelectrolyte or a mixture of a plurality of polyelectrolytes and one surfactant or a mixture of a plurality of surfactants. Said complexes may preferably be composed

- of one or more anionic polyelectrolytes and one or more cationic and/or nonionic surf actants or
- of one or more cationic polyelectrolytes and one or more anionic and/or nonionic surfactants or
- of one or more anionic polyelectrolytes, cationic polyelectrolytes and/or polyampholytes and one or more nonionic surfactants or
- of one or more polyampholytes and one or more ionic, amphoteric and/or nonionic surfactants.

The term polyampholytes is to be understood to refer to externally neutral amphoteric polyelectrolytes.

The anionic polyelectrolytes which are normally used contain from 20 to 100 mol % of one or of a mixture of a plurality of the following monomer unit(s) of group (1):

Group (1): monoethylenically unsaturated $C_3$- to $C_{10}$-monocarboyxlic acids, their alkali metal salts and/or ammonium salts, for example acrylic acid, methacrylic acid, dimethylacrylic acid, ethylacrylic acid, allylacetic acid or vinylacetic acid; also monoethylenically unsaturated $C_4$- to $C_8$-dicarboxylic acids, their hemiesters, anhydrides, alkali metal salts and/or ammonium salts, eg. maleic acid, fumaric acid, itaconic acid, mesaconic acid, methylenemalonic acid, citraconic acid, maleic anhydride, itaconic anhydride or methylmalonic anhydride; also sulfo group-containing monoethylenically unsaturated monomers, for example allylsulfonic acid, styrenesulfonic acid, 2-acrylamido-2-methylpropanesulfonic acid, methallylsulfonic acid, vinylsulfonic acid, 3-sulfopropyl acrylate or 3-sulfopropyl methacrylate; also phosphonic acid group-containing monoethylenically unsaturated monomers, eg. vinylphosphonic acid, allylphosphonic acid or acrylamidomethylpropanephosphonic acid.

Said polyelectrolytes can be employed in the acid form, partly neutralized or completely neutralized. Up to 80 mol % of the monomer units of the anionic polyelectrolyte in this context may comprise one or more nonionic monomers of group (2):

Group (2): $C_1$- to $C_{20}$-alkyl and -hydroxyalkyl esters of monoethylenically unsaturated $C_3$- to $C_{10}$-monocarboxylic acids or $C_4$- to $C_8$-dicarboxylic acids, eg. methyl acrylate, ethyl acrylate, n-butyl acrylate, stearyl acrylate, diethyl maleate, hydroxyethyl acrylate, hydroxypropyl acrylate, hydroxybutyl acrylate, hydroxyethyl methacrylate or hydroxypropyl methacrylate; also (meth)acrylates of alkoxylated $C_1$- to $C_{18}$-alcohols which have been reacted with from 2 to 50 mol of ethylene oxide, propylene oxide, butylene oxide or mixtures thereof; also amides and N-substituted amides of monoethylenically unsaturated $C_3$- to $C_{10}$-monocarboxylic acids or $C_4$- to $C_8$-dicarboxylic acids, eg. acrylamide, methacrylamide, N-alkylacrylamides or N,N-dialkylacrylamides each containing from 1 to 18C atoms in the alkyl group such as N-methylacrylamide, N,N-dimethylacrylamide, N-t-butylacrylamide or N-octadecylacrylamide, maleic acid monomethylhexylamide, maleic acid monodecyl-amide, dimethylaminopropylmethacrylamide or acrylamido glycolic acid; also alkylaminoalkyl (meth)acrylates, eg. dimethylamino-ethyl acrylate, dimethylaminoethyl methacrylate, ethylaminoethyl acrylate, diethylaminoethyl methacrylate, dimethylaminopropyl acrylate or dimethylaminopropyl methacrylate; also vinyl esters, eg. vinyl formate, vinyl acetate or vinyl propionate, where these, after the polymerization, may also be present in saponified form; also N-vinyl compounds, eg. N-vinylpyrrolidone, N-vinylcaprolactam, N-vinylformamide, N-vinyl-N-methylformamide, 1-vinylimidazole or 1-vinyl-2-methylimidazole; also vinyl ethers of $C_1$- to $C_{18}$-alcohols, vinyl ethers of alkoxylated $C_1$- to $C_{18}$-alcohols and vinyl ethers of polyalkylene oxides such as polyethylene oxide, polypropylene oxide or polybutylene oxide; also linear, branched or cyclic olefins, eg. ethene, propene, butenes, isobutene, 1-pentene, cyclopentene, 1-hexene, 1-heptene, 1-octene, 2,4,4'-trimethylpentene-1, 1-nonene, 1-decene, styrene or its derivatives such as α-methylstyrene, indene, dicyclopentadiene or higher olefins carrying reactive double bonds, such as oligopropene and polyisobutene.

The cationic polyelectrolytes used are normally those carrying amino groups and/or ammonium groups in the main chain and/or side chain. To prepare polymers containing amino or ammonium groups it is possible to employ, eg., the monomers listed in group (3) in proportions of from 20 to 100 mol %.

Group (3)

Monomers carrying amino or imino groups, such as eg. dimethylaminoethyl acrylate, diethylaminoethyl acrylate, dimethylaminopropyl methacrylamide, allylamine;

monomers carrying quaternary ammonium groups, eg. present as salts such as are obtained by reacting the basic amino functions with acids such as eg. hydrochloric acid, sulfuric acid, nitric acid, formic acid or acetic acid, or present in quaternized form (suitable quaternizing agents being, for example, dimethyl sulfate, diethyl sulfate, methyl chloride, ethyl chloride or benzyl chloride), such as eg. dimethylaminoethyl acrylate hydrochloride, diallyldimethylammonium chloride, dimethylaminoethyl acrylate methochloride, dimethylaminoethylaminopropylmethacrylamide methosulfate, vinylpyridinium salts and 1-vinylimidazolium salts;

monomers in which the amino group and/or ammonium group is un-masked only after polymerization and subsequent hydrolysis, such monomers being eg. N-vinylformamide and N-vinylacetamide.

Other cationic polyelectrolytes which can be used include polyethyleneimine or polypropyleneimine.

Said polyelectrolytes may be used in the base form, in neutralized form or in completely neutralized form. Up to 80 mol % of the monomer units of the cationic polyelectrolyte may then comprise one or more nonionic monomers of group (2).

Suitable polyampholytes (amphoteric polyelectrolytes) are prepared, as a rule, by copolymerization of from 20 to 80 mol % of monomers from group (1) and from group (3), the remaining 0 to 80 mol % optionally comprising nonionic monomers of group (2).

Suitable anionic surfactants include, for example, alkylbenzenesulfonates, fatty alcohol sulfates, fatty alcohol polyglycol ether sulfates, alkyl glyceryl ether sulfonates, fatty alcohol polyglycol ether methyl carboxylates, paraffin sulfonates, olefin sulfonates, sulfosuccinic acid hemi- and diesters, alkylphenol ether sulfates and alkyl- and dialkylphosphates. Typical compounds of this type are, for example, $C_8$- to $C_{18}$-alkanesulfonates, $C_{12}$- to $C_{16}$-alkyl sulfates, $C_{12}$- to $C_{16}$-alkyl sulfosuccinates and sulfated ethoxylated $C_{12}$- to $C_{16}$-alkanols.

Further suitable anionic surfactants include sulfated fatty acid alkanolamines, α-sulfofatty acid esters or fatty acid mono-glycerides. Other suitable anionic surfactants are fatty acid esters or fatty acid sarcosides, fatty acid glycolates, fatty acid lactates, fatty acid taurides or fatty acid isothionates.

The anionic surfactants may be present in the form of the sodium salts, potassium salts or ammonium salts or as soluble salts of organic bases such as mono-, di- or triethanolamine or other substituted amines. The anionic surfactants also include the customary soaps, ie. the alkali metal salts of the natural fatty acids.

Nonionic surfactants (nonionics) which can be used include, eg. polyalkylene oxide adducts such as ethylene oxide/propylene oxide block polymers, fatty acid esters of polyhydroxy compounds, eg. sorbitan alkyl esters, glycerol alkyl esters, fatty acid alkylolamides or fatty acid alkylolamido ethoxylates, and addition products of from 3 to 40, preferably from 4 to 20, mol of ethylene oxide to 1 mol of fatty alcohol, alkylphenol, fatty acid, fatty amine, fatty acid amide or alkanesulfonamide. Nonionic surfactants of the type of the amine oxides or sulfoxides can likewise be used.

The cationic surfactants used are normally those which contain ammonium groups, the ammonium compound optionally being based on an open-chain amine, eg. $C_8$- to $C_{18}$-alkyltrimethylammonium chlorides or bromide, diallyldimethylammonium chloride or lauryl-benzyl-dimethylammonium chloride. Also suitable are cationic surfactants based on a cyclic amine or imine, eg. cationic surfactants containing pyridinium groups, imidazolinium groups, piperidinium groups, oxazolinium groups or pyrimidinium groups.

Suitable amphoteric surfactants which are externally neutral as a rule carry basic groups such as amino groups and acidic groups such as sulfonate groups, sulfate groups or carboxyl groups. Suitable amphoteric surfactants include, for example, mono- and dialkylaminopropylaminocarboxylic acids and phosphoglycerides.

The preparation of the novel mesomorphic polyelectrolyte-surfactant complexes is preferably carried out by a solution of a surfactant, usually in stoichiometric excess with respect to the ionic groups of the polyelectrolyte, being added to a (partially) neutralized aqueous solution of the polyelectrolyte which contains ionic groups whose charge is opposite to that of the surfactant. To dissolve the precipitated complex, which still has an amorphous structure, an organic solvent is added for the purpose of the present invention, preferably an alcohol which is not completely miscible with water, such as 2-butanol, an ester, in particular carboxylic acid ester, such as ethyl acetate, an ether such as tetrahydrofuran, a ketone such as butanone or a mixture of such solvents in which the complex can redissolve. If required, the organic phase can be washed a number of times with water, in the sense of a sol-gel separation process, to wash out excess surfactant and salt. Via evaporation of the organic solvent from the solution or gel phase produced, the polyelectrolyte-surfactant complex having a mesomorphic structure is obtained as a solid, eg. as a film. Also present in the solution or gel phase of the mesomorphic polyelectrolyte-surfactant complex may be further components such as polymers or low molecular-weight compounds, eg. plasticizers, thickeners, compatibility promoters, colorants, light stabilizers, but also structure-stabilizing components such as glass fibers or carbon fibers, which are then also incorporated into the resulting solid.

It is further possible for films or layers of the mesomorphic poly-electrolyte-surfactant complexes to be applied to suitable inorganic or organic substrate materials from the solution or gel phase produced by evaporating the organic solvent and thus to for a coating with the mesomorphic polyelectrolyte-surfactant complex to be obtained.

To prepare the amorphous polyelectrolyte-surfactant complex as a precursor in solution it is also possible to add non-neutralized surfactants (eg. didodecylmethylamine) to non-neutralized polyelectrolytes (eg. poly(acrylic acid)).

The provision of the novel mesomorphic polyelectrolyte-surfactant complexes can also be effected without a solvent by them being prepared, for the purposes of the present invention, by processing from the melt of the corresponding amorphous polyelectrolyte-surfactant complexes. To do this, a melt of an appropriate thermoplastic polyelectrolyte can be admixed with an appropriate surfactant, or the mixture of an appropriate polyelectrolyte and an appropriate surfactant can be fused and the melt can be further processed in a shaping process. via extrusion, for example, of the molten polyelectrolyte-surfactant complex it is thus possible to fabricate extrudates, sections, panels, pipes or coatings. Coextrusion, in particular, with further polymers allows the desired material characteristics to be achieved. Molded parts and sheeting made of thermoplastic polyelectrolyte-surfactant complexes can be fabricated by injection-molding or calendering.

Processing from the melt often requires various adjuvants, eg. plasticizers, to be admixed. Additionally, further components such as stabilizers, fillers or colorants may be added to the melt of the polyelectrolyte-surfactant complex. If required it is also possible for mixtures of the polyelectrolse-surfactant complex with further polymers and compatibility promoters to be processed from the melt.

The present invention also relates to industrially useful materials, ie. films, sheets, fibers, molded articles and coatings, the term molded articles referrring to, for example, extrudates, sections, panels, pipes, but also granular compositions or pellets, which include the novel mesomorphic complexes of polyelectrolytes and surfactants or are made from them.

The content in these materials of the novel mesomorphic polyelectrolyte-surfactant complexes is usually from 5 to 100 wt. %, in particular from 50 to 100 wt. %, especially from 80 to 100 wt. %.

The said materials according to the invention are suitable, for example, as materials for producing nonporous membranes, as packaging material (eg. as a barrier film for gases), for producing hollow fibers, as a coating material or as components in optical or electrooptical components.

Owing to the anisotropic properties of the material, the industrial articles listed exhibit improved mechanical, thermal or application characteristics, compared with the corresponding conventional industrial articles; for example, these materials can be used to produce oxygen-impermeable films which can advantageously be used for packaging highly perishable food.

Preparation and characterization examples

EXAMPLE 1
Preparation of polystyrene sulfonate sodium salt (PSSNa)

Anionically polymerized polystyrene ($M_w$=449,000 g/mol, $M_w/M_n$<1.05) was converted by means of sulfuric acid and phosphorus pentoxide, by a method similar to the method by H. Vink, into the sodium salt of polystyrene sulfonic acid (H. Vink, Makromol. Chem. 182, 279, 1981). The degree of sulfonation S was determined by elemental analysis and was S>0.9. The polystyrene sulfonate sodium salt was dialyzed against deionized water and freeze-dried.

EXAMPLES 2 TO 5
Preparation of the complex of PSSNa and alkyltrimethylammonium chloride PSSNa (5.0 g) was dissolved in 0.01 molar aqueous sodium sulfate solution (400 ml). A 1.5-fold stoichiometric excess of dodecyltrimethylammonium chloride (9.6 g), dissolved in deionized water (100 ml), was added dropwise. The precipitated complex was filtered off and washed with water.

The dodecyltrimethylasmonium chloride (Example 2) was replaced by 10.6 g of tetradecyltrimethylammonium chloride (Example 3), 11.6 g of hexadecyltrimethylammonium chloride (Example 4) and 12.7 g of octadecyltrimethylammonium chloride (Example 5). The reactions and workup were carried out by a method similar to Example 2.

EXAMPLES 6 TO 9
Purification of the PSSNa-alkyltrimethylammonium chloride complexes from Examples 2 to 5

The precipitated complex which still contained certain amounts of excess surfactant and of resulting salt was dissolved in 2-butanol. Deionized water was added until phase separation into a complex-rich gel phase and a surfactant- and salt-rich aqueous phase occurred. The aqueous phase was discarded and the sol-gel separation process was repeated a number of times until the water phase was virtually free from halide ions (detection by means of $AgNO_3$).

EXAMPLES 10 TO 13
Preparation of mesomorphic films from the purified PSSNa-alkyltrimethylammonium chloride complexes of Examples 6 to 9

The gel phase of the complex in 2-butanol was poured onto a planar glass plate which had been pretreated with octadecyltrichlorosilane. In so doing, the two-dimensional geometry of the film being formed was predefined by an adjustable sheet metal frame which was mounted on the glass surface. After the solvent 2-butanol had slowly evaporated, the film could be easily peeled off the glass surface.

EXAMPLES 14 TO 17
Measurement of the small-angle X-ray diffractograms of the mesomorphic films from Examples 10 to 13

The small-angle X-ray diffractograms were measured by means of an Anton Paar compact Kratky camera using a $Cu-K_\alpha$ source (Phillips pw1830 generator). Monochromatization was performed by means of a nickel filter. Pulse height discrimination was applied. The measurements were carried out in a scattering-vector range of from $1.0 \cdot 10^{-3}$ Å$^{-1}$ to $9.0 \cdot 10^{-2}$ Å$^{-1}$. The scattering vector s is defined by $s=2/\lambda \cdot \sin\theta$, $2\theta$ denoting the angle between the incident ray and the scattered ray, and $\lambda$ signifying the wavelength of the radiation used.

The table following Example 21 shows the results of the measurements on the films from Examples 10 to 13.

EXAMPLE 18
Preparation of a complex of poly(acrylic acid) and dodecyltrimethylammonium chloride Poly(acrylic acid) (5.0 g, $M_w$=250,000 g/mol) was dissolved in water and converted into the sodium salt by means of NaOH. A solution of dodecyltrimethylamonium chloride (24 g) in water (200 ml) was added dropwise with stirring. The precipitated complex was filtered off.

EXAMPLE 19
Purification of the complex from Example 18

The purification was carried out by a method similar to that indicated in Examples 6 to 9.

EXAMPLE 20
Preparation of a mesomorphic film from the purified complex from Example 19

The mesomorphic film was prepared by a method similar to that indicated in Examples 10 to 13.

EXAMPLE 21
Measurement of the small-angle X-ray diffractograms of the mesomorphic film from Example 20

The measurement was carried out in accordance with the method specified in Examples 14 to 17. The following table shows the measurement on the film from Example 20.

TABLE

| Small-angle X-ray diffractograms (position of the main peak) | | |
|---|---|---|
| Example No. | I/cps | $s/nm^{-1}$ |
| 14 | 98 | 0.34 |
| 15 | 93 | 0.32 |
| 16 | 88 | 0.285 |
| 17 | 260 | 0.245 |
| 21 | 305 | 0.30 |

We claim:

1. A mesomorphic complex of an anionic polyelectrolyte, cationic polyelectrolyte and/or polyampholyte and a cationic, anionic, nonionic and/or amphoteric surfactant, said complex comprising
   (a) one or more anionic polyelectrolytes and one or more cationic surfactants or
   (b) one or more cationic polyelectrolytes and one or more anionic surfactants or
   (d) one or more polyampholytes and one of more ionic, amphoteric and/or nonionic surfactants.

2. A method for preparing a mesomorphic complex of a polyelectrolyte and surfactant as claimed in claim 1, which comprises dissolving a corresponding amorphous polyelectrolyte-surfactant complex, a stoichiometric excess of said surfactant with respect to the ionic groups of the polyelectrolyte having been used to prepare them, in an organic solvent and evaporating said solvent from a solution or gel phase produced.

3. A method for preparing a mesomorphic complex of a polyelectrolyte and surfactant as claimed in claim 1, which comprises preparing said complex by processing from a melt of a corresponding amorphous polyelectrolyte-surfactant complexes.

4. A film, sheet, fiber, molding or coating containing the mesomorphic complex of a polyelectrolyte and surfactant as claimed in claim 1.

5. A method for preparing a mesomorphic complex of a polyelectrolyte and a surfactant, which comprises preparing said complex by processing from a melt of a corresponding amorphous polyelectrolyte-surfactant complexes, wherein said complex comprises
   (a) one of more anionic polyelectrolytes and one or more cationic and/or nonionic surfactants or
   (b) one of more cationic polyelectrolytes and one or more anionic and/or nonionic surfactants or
   (c) one or more anionic polyelectrolytes, cationic polyelectrolytes and/or polyampholytes and one or more nonionic surfactants or
   (d) one or more polyampholytes and one or more ionic, amphoteric and/or nonionic surfactants.

6. A film, sheet, fiber, molding or coating containing 50 to 100 wt. % of a mesomorphic complex of a polyelectrolyte and a surfactant, wherein said complex comprises
   (a) one of more anionic polyelectrolytes and one or more cationic and/or nonionic surfactants or
   (b) one of more cationic polyelectrolytes and one or more anionic and/or nonionic surfactants or
   (c) one or more anionic polyelectrolytes, cationic polyelectrolytes and/or polyampholytes and one or more nonionic surfactants or
   (d) one or more polyampholytes and one or more ionic, amphoteric and/or nonionic surfactants.

7. The film, sheet fiber, molding or coating of claim 6, wherein the mesomorphic complex is prepared by a process comprising dissolving a corresponding amorphous polyelectrolyte-surfactant complex, a stoichiometric excess of said surfactant with respect to the ionic groups of the polyelectrolyte having been used to prepare them, in an organic solvent and evaporating said solvent from a solution or gel phase produced.

8. The film, sheet, fiber, molding or coating of claim 6, wherein the mesomorphic complex is prepared by processing from a melt a corresponding amorphous polyelectrolyte-surfactant complex.

9. A film, sheet, fiber, molding or coating containing 5 to 100 wt. % of the mesomorphic complex of claim 1.

10. A film, sheet, fiber, molding or coating containing 50 to 100 wt. % of the mesomorphic complex of claim 1.

11. A film, sheet, fiber, molding or coating containing 80 to 100 wt. % of the mesomorphic complex of claim 1.

12. The film, sheet, fiber, molding or coating of claim 6, containing 80 to 100 wt. % of the mesomorphic complex.

13. The mesomorphic complex of claim 1, said complex comprising one or more anionic polyelectrolytes.

14. The mesomorphic complex of claim 1, said complex comprising one or more cationic polyelectrolytes.

15. The mesomorphic complex of claim 1, said complex comprising one or more polyamopholytes.

16. The film, sheet, fiber, molding or coating of claim 6, said mesomorphic complex comprising one or more anionic polyelectrolytes.

17. The film, sheet, fiber, molding or coating of claim 6, said mesomorphic complex comprising one or more cationic polyelectrolytes.

18. The film, sheet, fiber, molding or coating of claim 6, said mesomorphic complex comprising one or more nonionic surfactants.

19. The film, sheet, fiber, molding or coating of claim 6, said mesomorphic complex comprising one or more polyamopholytes.

* * * * *